United States Patent
Ito (10) Patent No.: US 11,474,754 B2
(45) Date of Patent: Oct. 18, 2022

(54) MOBILE TERMINAL THAT REMOTELY CONTROLS A WIRELESS COMMUNICATION APPARATUS AND DISPLAYS A NOTIFICATION FROM THE WIRELESS COMMUNICATION APPARATUS, METHOD OF CONTROLLING SAME, AND STORAGE MEDIUM

(71) Applicant: CANON KABUSHIKI KAISHA, Tokyo (JP)

(72) Inventor: Morikazu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/685,086

(22) Filed: Nov. 15, 2019

(65) Prior Publication Data

US 2020/0081662 A1 Mar. 12, 2020

Related U.S. Application Data

(63) Continuation of application No. 15/984,560, filed on May 21, 2018, now Pat. No. 10,514,869.

(30) Foreign Application Priority Data

May 23, 2017 (JP) .............................. JP2017-101802

(51) Int. Cl.
*G06F 3/12* (2006.01)
*H04W 4/90* (2018.01)
(Continued)

(52) U.S. Cl.
CPC .......... *G06F 3/1204* (2013.01); *G06F 3/1209* (2013.01); *G06F 3/1226* (2013.01);
(Continued)

(58) Field of Classification Search
None
See application file for complete search history.

(56) References Cited

U.S. PATENT DOCUMENTS

2012/0075485 A1* 3/2012 Mizutani ........... H04M 1/72412
348/207.1
2013/0244579 A1* 9/2013 Hohteri ................. H04W 76/14
455/41.2
(Continued)

FOREIGN PATENT DOCUMENTS

CN 106998525 A ‡ 8/2017 ............ H04W 24/08
CN 106998525 A 8/2017
(Continued)

OTHER PUBLICATIONS

Office Action issued in Chinese Application No. 201810491743.1 dated Sep. 16, 2019. English equivalent provided.‡

(Continued)

*Primary Examiner* — Andrew H Lam
(74) *Attorney, Agent, or Firm* — Rossi, Kimms & McDowell, LLP (57) ABSTRACT

A mobile terminal that is capable of preventing an unnecessary notification from being provided. A wireless communication apparatus designated by a user is registered. When radio waves transmitted by the wireless communication are received, a notification is provided for confirming with a user whether or not to give an instruction to a wireless communication apparatus as a transmission source of the received radio waves transmitted by the wireless communication. It is determined whether or not the wireless communication apparatus as the transmission source has already been registered, and when it is determined that the wireless communication apparatus as the transmission source has already been registered, the notification is provided.

18 Claims, 10 Drawing Sheets

(51) Int. Cl.
*H04W 68/00* (2009.01)
*H04L 67/55* (2022.01)
*H04W 84/12* (2009.01)
*H04W 4/021* (2018.01)
*H04L 67/12* (2022.01)
*H04W 4/80* (2018.01)

(52) U.S. Cl.
CPC .......... *G06F 3/1236* (2013.01); *G06F 3/1255* (2013.01); *H04L 67/55* (2022.05); *H04W 4/90* (2018.02); *H04W 68/005* (2013.01); *G06F 3/122* (2013.01); *G06F 3/1268* (2013.01); *G06F 3/1292* (2013.01); *H04L 67/12* (2013.01); *H04W 4/021* (2013.01); *H04W 4/80* (2018.02); *H04W 84/12* (2013.01)

(56) References Cited

U.S. PATENT DOCUMENTS

| | | | | |
|---|---|---|---|---|
| 2014/0157135 | A1* | 6/2014 | Lee | G06F 3/0482 715/738 |
| 2016/0360363 | A1‡ | 12/2016 | Mochizuki | G01S 5/0289 |
| 2017/0094449 | A1‡ | 3/2017 | Murakawa | H04W 24/08 |
| 2017/0142767 | A1* | 5/2017 | Furubayashi | H04W 76/14 |
| 2018/0007219 | A1‡ | 1/2018 | Oyama | G06F 3/04817 |
| 2018/0255192 | A1* | 9/2018 | Fujii | H04N 1/32625 |

FOREIGN PATENT DOCUMENTS

| | | | |
|---|---|---|---|
| JP | 2012173070 | A ‡ | 9/2012 |
| JP | 2012173070 | A | 9/2012 |
| JP | 2014217049 | A | 11/2014 |
| WO | 2015029231 | A1 | 3/2015 |

OTHER PUBLICATIONS

Office Action issued in Chinese Application No. 201810491743.1 dated Sep. 16, 2019. English translation provided.

Office Action issued in U.S. Appl. No. 15/984,560 dated Oct. 18, 2018.

Office Action issued in U.S. Appl. No. 15/984,560 dated May 6, 2019.

Notice of Allowance issued in U.S. Appl. No. 15/984,560 dated Aug. 19, 2019.

Office Action issued in Japanese Appln. No. 2017-101802 dated Feb. 16, 2021.

* cited by examiner
‡ imported from a related application

| | |
|---|---|
| 10 m | 90 dbm |
| 5 m | 80 dbm |
| 3 m | 70 dbm |
| 1 m | 60 dbm |
| 50 cm | 50 dbm |
| 30 cm | 40 dbm |
| 10 cm | 30 dbm |

MOBILE TERMINAL THAT REMOTELY CONTROLS A WIRELESS COMMUNICATION APPARATUS AND DISPLAYS A NOTIFICATION FROM THE WIRELESS COMMUNICATION APPARATUS, METHOD OF CONTROLLING SAME, AND STORAGE MEDIUM

BACKGROUND OF THE INVENTION

Field of the Invention

The present invention relates to a mobile terminal that provides a notification by wireless communication, a method of controlling the same, and a storage medium.

Description of the Related Art

There has been known a mobile terminal that performs wireless communication using BLE (Bluetooth (registered trademark) Low Energy), Wi-Fi, or the like. Upon receipt of radio waves transmitted by wireless communication (hereinafter referred to as the "wireless radio waves"), the mobile terminal estimates a distance to a wireless communication apparatus which has transmitted the wireless radio waves, based on the radio wave strength of the received wireless radio waves (see e.g. Japanese Laid-Open Patent Publication (Kokai) No. 2012-173070).

Further, the mobile terminal remotely controls the wireless communication apparatus by wireless communication. The mobile terminal recognizes a wireless communication apparatus satisfying a predetermined notification condition, for example, a wireless communication apparatus the estimated distance to which is within a predetermined notification-enabling distance, as a control target apparatus, and provides a notification for confirming with a user of the mobile terminal whether or not to give an instruction to the control target apparatus.

However, the conventional mobile terminal has a problem that even a wireless communication apparatus which is not usually used by the user is recognized by the mobile terminal as the control target apparatus if the wireless communication apparatus satisfies the above-mentioned notification condition, and as a result, there arises a problem that an unnecessary notification with respect to the wireless communication apparatus not used by the user is provided to the user.

SUMMARY OF THE INVENTION

The present invention provides a mobile terminal that is capable of preventing an unnecessary notification from being provided, a method of controlling the same, and a storage medium.

In a first aspect of the present invention, there is provided a mobile terminal that remotely controls a wireless communication apparatus by wireless communication, comprising a registration unit configured to register a wireless communication apparatus designated by a user, a reception unit configured to receive radio waves transmitted by the wireless communication, a notification unit configured to provide a notification for confirming with a user whether or not to give an instruction to a wireless communication apparatus as a transmission source of the received radio waves transmitted by the wireless communication, and a determination unit configured to determine whether or not the wireless communication apparatus as the transmission source has already been registered, wherein in a case where it is determined that the wireless communication apparatus as the transmission source has already been registered, the notification unit provides the notification.

In a second aspect of the present invention, there is provided a method of controlling a mobile terminal that remotely controls a wireless communication apparatus by wireless communication, comprising registering a wireless communication apparatus designated by a user, receiving radio waves transmitted by the wireless communication, providing a notification for confirming with a user whether or not to give an instruction to a wireless communication apparatus as a transmission source of the received radio waves transmitted by the wireless communication, and determining whether or not the wireless communication apparatus as the transmission source has already been registered, wherein said providing the notification includes providing the notification in a case where it is determined that the wireless communication apparatus as the transmission source has already been registered.

In a third aspect of the present invention, there is provided a non-transitory computer-readable storage medium storing a computer-executable program for executing a method of controlling a mobile terminal that remotely controls a wireless communication apparatus by wireless communication, wherein the method comprises registering a wireless communication apparatus designated by a user, receiving radio waves transmitted by the wireless communication, providing a notification for confirming with a user whether or not to give an instruction to a wireless communication apparatus as a transmission source of the received radio waves transmitted by the wireless communication, and determining whether or not the wireless communication apparatus as the transmission source has already been registered, wherein said providing the notification includes providing the notification in a case where it is determined that the wireless communication apparatus as the transmission source has already been registered.

According to the present invention, it is possible to prevent a mobile terminal from providing an unnecessary notification by wireless communication.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
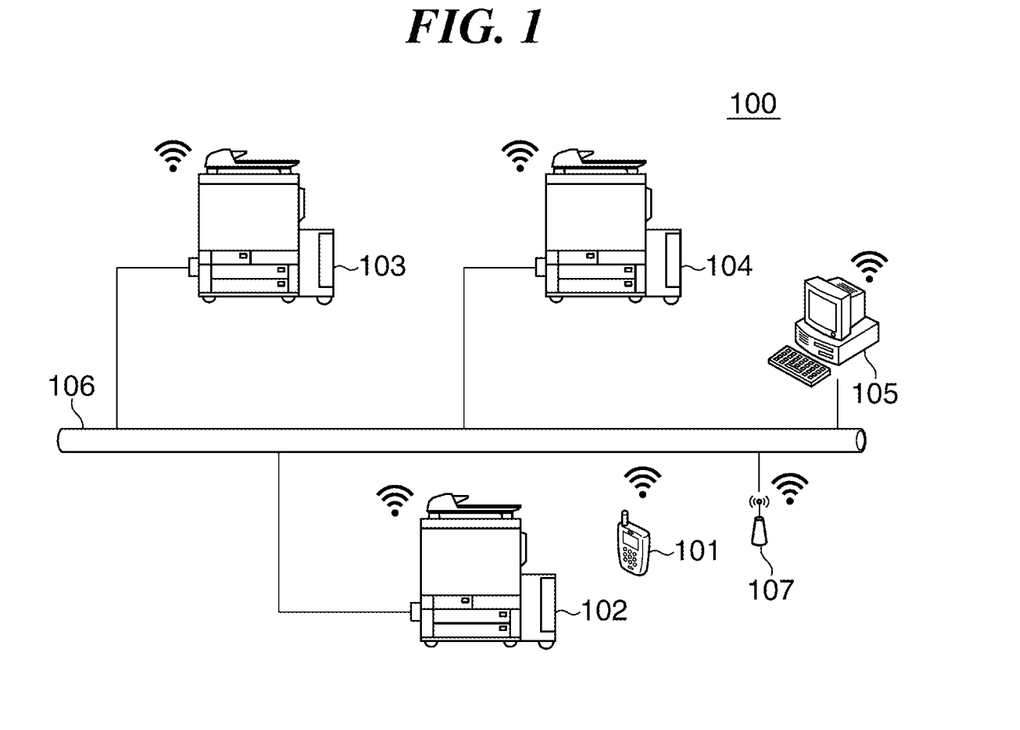
FIG. 1 is a schematic network diagram of a remote control system including a mobile terminal according to an embodiment of the present invention.

FIG. 1 is a schematic network diagram of a remote control system 100 including a mobile terminal 101 according to an embodiment of the present invention.

Referring to FIG. 1, the remote control system 100 includes the mobile terminal 101, MFPs 102 to 104 as wireless communication apparatuses, and a PC 105. The MFPs 102 to 104 and the PC 105 are connected to each other via a network 106.

In the remote control system 100, a user can remotely control the MFPs 102 to 104 using the mobile terminal 101, and for example, the user can log into the MFPs 102 to 104 from the mobile terminal 101.

Figure 2:
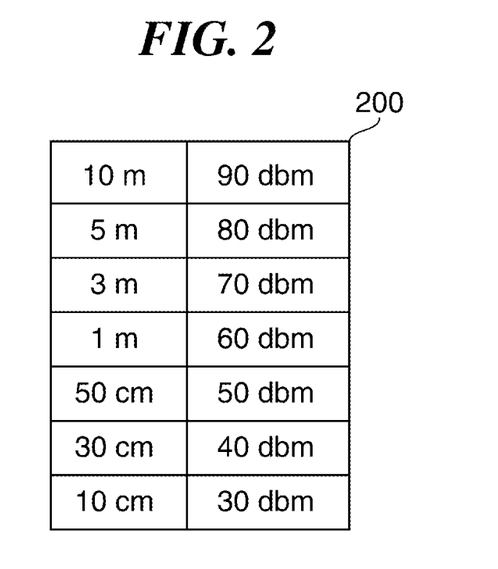
FIG. 2 is a diagram showing an example of a table stored in the mobile terminal appearing in FIG. 1.

The mobile terminal 101 is a communication device which can be carried by a user, such as a smartphone and a tablet terminal, and performs wireless communication using BLE, Wi-Fi, or the like. In the following description, communication using BLE is referred to as BLE communication, and communication using Wi-Fi is referred to as Wi-Fi communication. When the mobile terminal 101 detects an MFP which can perform wireless communication, the mobile terminal 101 transmits login information, such as a user ID and a password, to the detected MFP so as to log into the same. The login information has been stored in the mobile terminal 101 in advance. Further, the mobile terminal 101 stores a table 200 shown in FIG. 2, in which radio wave strength and distance information are associated with each other. The mobile terminal 101 estimates, based on the radio wave strength of radio waves of wireless communication (hereinafter referred to as "wireless radio waves") which have been received and the table 200, a distance to the MFP as a transmission source of the wireless radio waves. For example, assuming that the radio wave strength of the received wireless radio waves is 60 dbm, the mobile terminal 101 estimates a distance to the MFP as the transmission source of the received wireless radio waves as 1 m.

Further, the mobile terminal 101 can additionally install an application module (hereinafter simply referred to as the "application") for realizing a function desired by a user, according to a user's instruction. In the present embodiment, it is assumed, by way of example, that an MFP application, not shown, for remotely controlling an MFP which can perform wireless communication, such as the MFPs 102 to MFP 104, from the mobile terminal 101, has already been installed in the mobile terminal 101.

Each of the MFPs 102 to 104 is an image processing apparatus that performs image processing, and performs scan processing for reading an original placed on an original platen glass, not shown, and print processing for performing printing based on print data acquired e.g. from the PC 105. The MFPs 102 to 104 perform BLE communication directly with the mobile terminal 101, and further, perform Wi-Fi communication with the mobile terminal 101 via an access point 107. The PC 105 transmits print data and the like to the MFPs 102 to 104 via the network 106.

Figure 3:
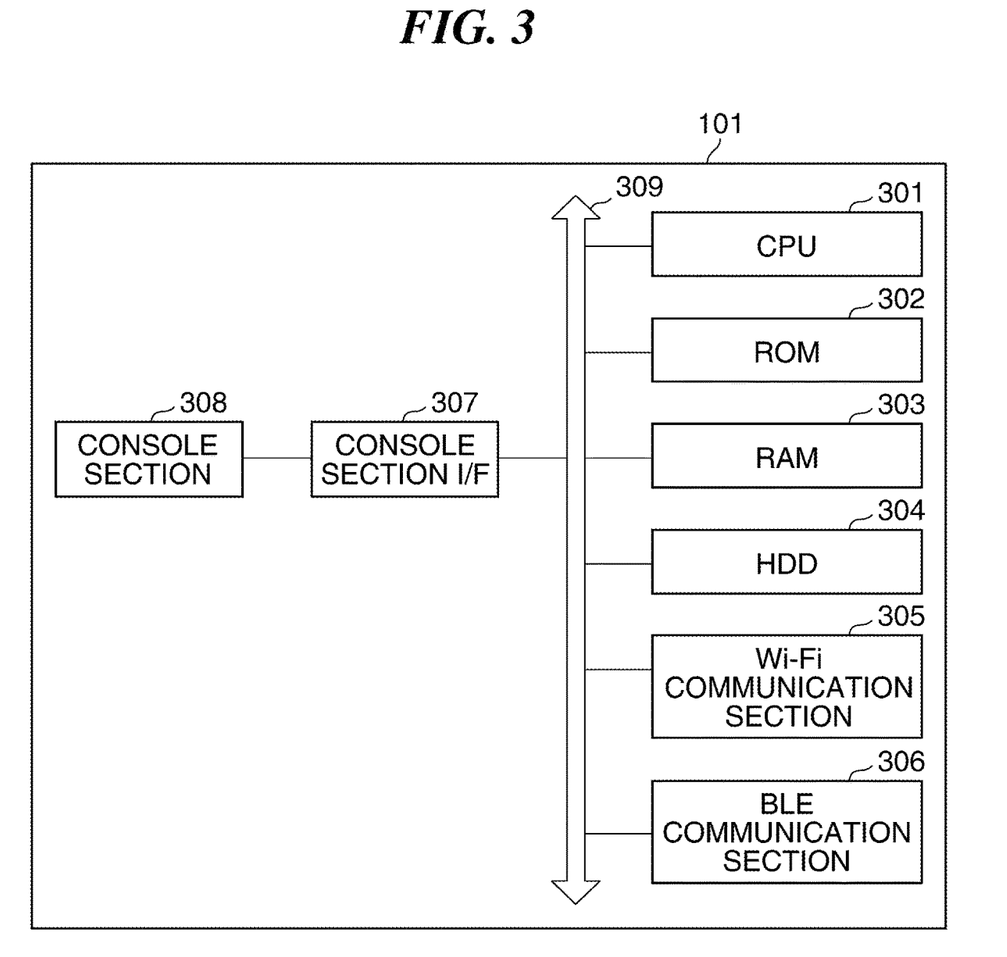
FIG. 3 is a schematic block diagram of the mobile terminal.

FIG. 3 is a schematic block diagram of the mobile terminal 101 appearing in FIG. 1.

Referring to FIG. 3, the mobile terminal 101 includes a CPU 301, a ROM 302, a RAM 303, an HDD 304, a Wi-Fi communication section 305 (reception unit), a BLE communication section 306 (reception unit), a console section interface 307, and a console section 308. The CPU 301, the ROM 302, the RAM 303, the HDD 304, the Wi-Fi communication section 305, the BLE communication section 306, and the console section interface 307 are interconnected via a system bus 309. The console section 308 is connected to the console section interface 307.

The CPU 301 controls the overall operation of the mobile terminal 101 by executing programs stored in the ROM 302. The CPU 301 starts the MFP application by executing a control program of the MFP application, stored e.g. in the ROM 302, and thereby remotely controls the MFPs 102 to 104. The ROM 302 stores the programs executed by the CPU 301, and setting data. The RAM 303 is used as a main memory for the CPU 301, and also used as an area for temporarily storing data. The HDD 304 stores image data, etc. The Wi-Fi communication section 305 performs Wi-Fi communication with the MFPs 102 to 104, the PC 105, and so forth. The BLE communication section 306 performs BLE communication with the MFPs 102 to 104, and so forth. The console section interface 307 connects between the console section 308 and the system bus 309. The console section 308 includes a touch-panel type display, not shown, which can detect a touch operation performed by a user, and operation screens are displayed on the display section.

Next, the configuration of the MFPs 102 to 104 will be described. In the present embodiment, the MFPs 102 to 104 have the same configuration, and hence the following description is given of the configuration of the MFP 102, by way of example.

Figure 4:
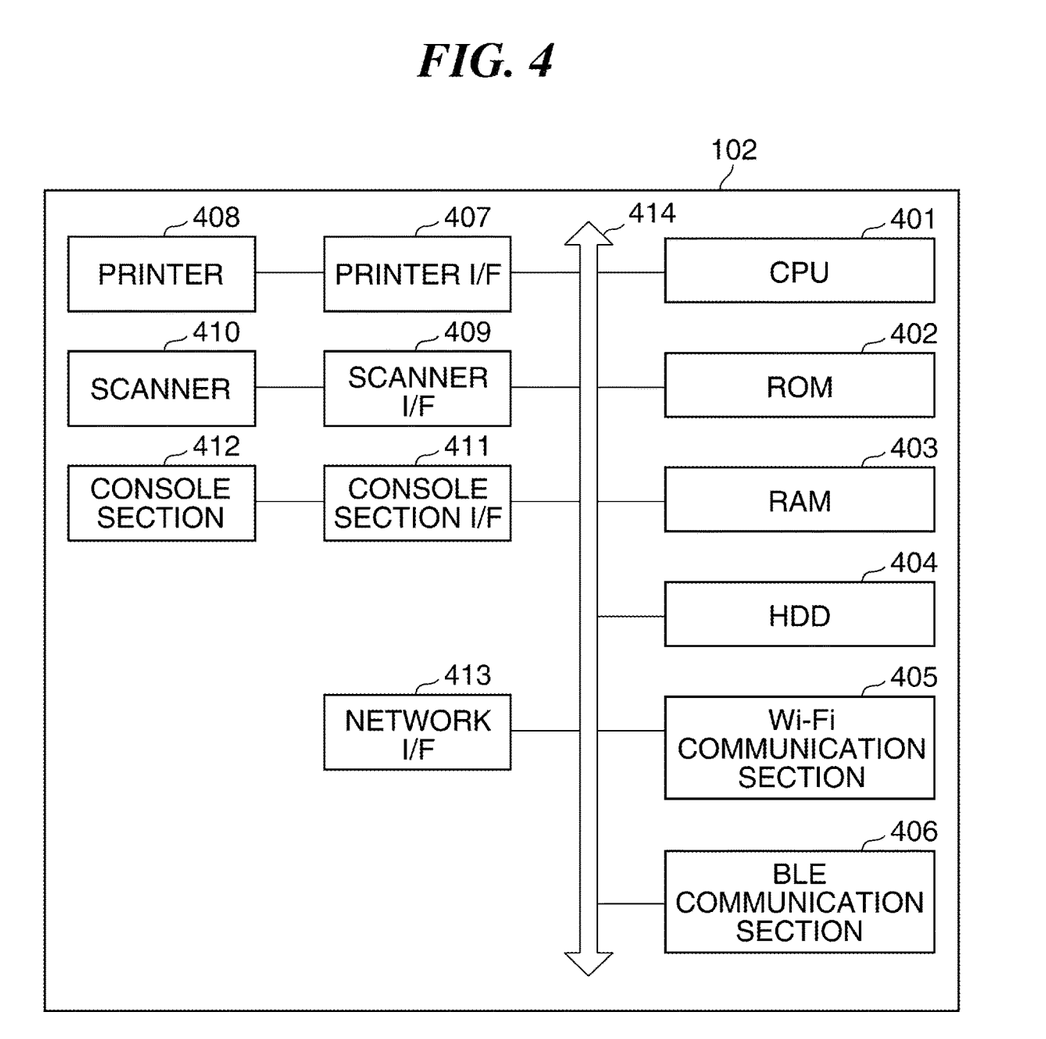
FIG. 4 is a schematic block diagram of an NFP appearing in FIG. 1.

FIG. 4 is a schematic block diagram of the MFP 102 appearing in FIG. 1.

Referring to FIG. 4, the MFP 102 includes a CPU 401, a ROM 402, a RAM 403, an HDD 404, a Wi-Fi communication section 405, a BLE communication section 406, a printer interface 407, a printer 408, a scanner interface 409, and a scanner 410. Further, the MFP 102 includes a console section interface 411, a console section 412, and a network interface 413. The CPU 401, the ROM 402, the RAM 403, the HDD 404, the Wi-Fi communication section 405, the BLE communication section 406, the printer interface 407, the scanner interface 409, the console section interface 411, and the network interface 413 are interconnected via a system bus 414. The printer 408 is connected to the printer interface 407, the scanner 410 is connected to the scanner interface 409, and the console section 412 is connected to the console section interface 411.

The CPU 401 controls the overall operation of the MFP 102 by executing programs stored in the ROM 402. The ROM 402 stores the programs executed by the CPU 401, and setting data. The RAM 403 is used as a main memory for the CPU 401, and is also used as an area for temporarily storing data. The HDD 404 stores print data, scanned images, etc. The Wi-Fi communication section 405 performs Wi-Fi communication with the mobile terminal 101, the PC 105, or the like. The BLE communication section 406 performs BLE communication with the mobile terminal 101, or the like. The printer interface 407 connects between the printer 408 and the system bus 414. The printer 408 performs printing on a sheet based on print data acquired from the PC 105 or a scanned image generated by the scanner 410. The scanner interface 409 connects between the scanner 410 and the system bus 414. The scanner 410 reads an original placed on an original platen glass, not shown, and generates a scanned image based on the read information. The console section interface 411 connects between the console section 412 and the system bus 414. The console section 412 includes a touch-panel type display which can detect a touch operation performed by a user, and a keyboard, neither of which is shown, and operation screens are displayed on the display section.

Next, a description will be given of processing performed in the remote control system 100 when the mobile terminal 101 logs into one of the MFPs 102 to 104.

In the remote control system 100, when the mobile terminal 101 receives wireless radio waves e.g. from the MFP 102, if a predetermined condition, such as a condition that the distance to the MFP 102 is within a predetermined notification-enabling distance, is satisfied, the mobile terminal 101 executes login notification (operation of a notification unit). More specifically, the mobile terminal 101 displays a notification 501, shown in FIG. 5, on the console section 308. The notification 501 includes a message for confirming with a user whether or not to log into the MFP 102. After that, when the user touches the notification 501, the mobile terminal 101 transmits the login information for logging into the MFP 102, to the MFP 102, and the MFP 102 performs login processing based on the acquired login information. In a conventional remote control system, a login notification with respect to an MFP satisfying the notification condition is displayed on a console section, regardless of whether or not the MFP is an MFP used by the user. This causes a problem in the conventional remote control system, that if an MFP which is not usually used by the user satisfies the notification condition, an unnecessary notification concerning the MFP other than an MFP which is used by the user is provided.

Figure 5:
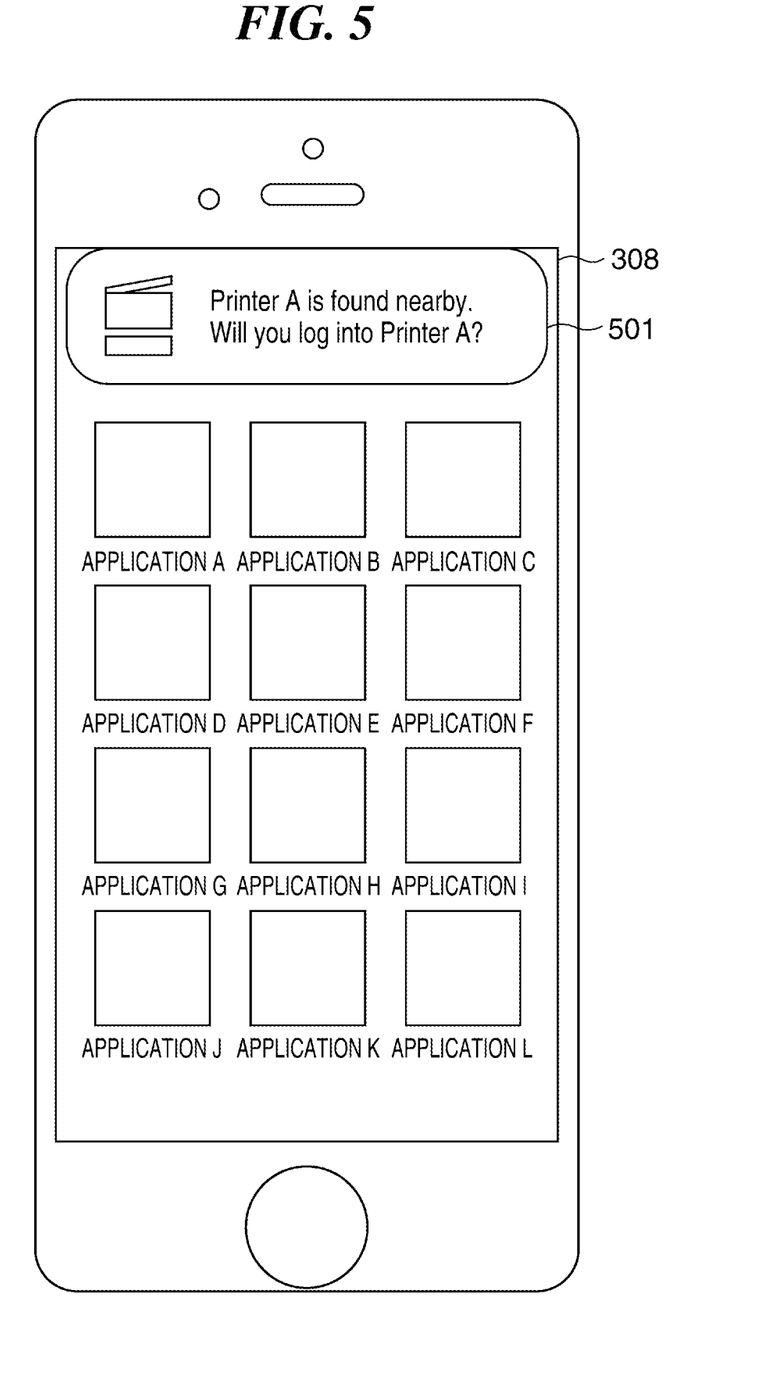
FIG. 5 is a diagram showing an example of a notification displayed on the mobile terminal.

To solve this problem, in the present embodiment, the notification 501 is displayed on the console section 308 in a case where the MFP 102 as the transmission source of the received wireless radio waves has already been registered in the MFP application.

Figure 6:
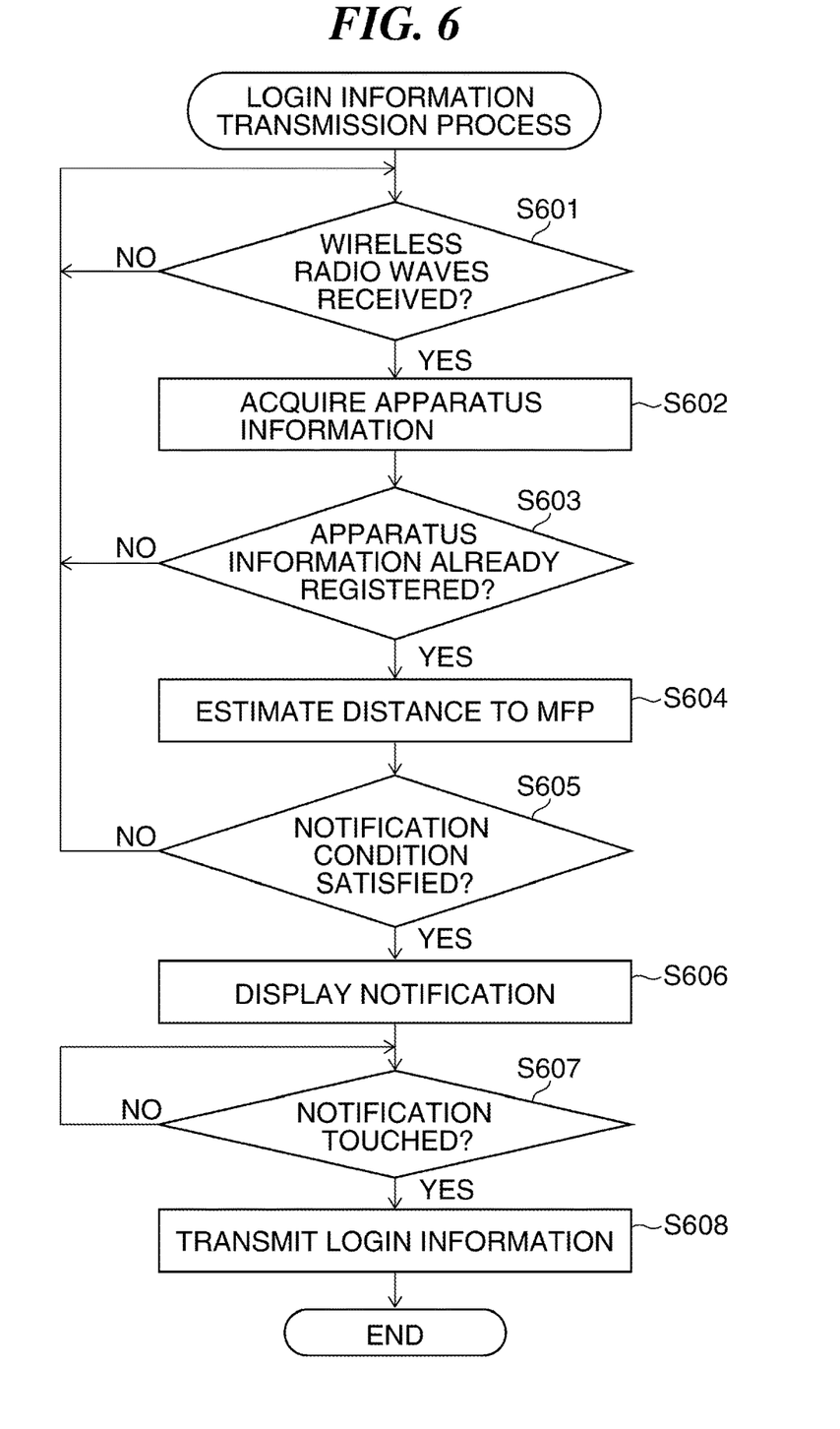
FIG. 6 is a flowchart of a login information transmission process performed by the mobile terminal.

FIG. 6 is a flowchart of a login information transmission process performed by the mobile terminal 101.

The login information transmission process in FIG. 6 is performed by the CPU 301 that executes the control program of the MFP application stored in the ROM 302, and it is assumed that wireless radio waves are transmitted from any of the MFPs 102 to 104 and other MFPs than these. Further, in the login information transmission process in FIG. 6, it is assumed, by way of example, that the MFPs 102 to 104 have been registered in the MFP application by registration processing performed in advance. In the registration processing, the mobile terminal 101 is connected to an MFP to be registered, by wireless communication, acquires apparatus information, such as a MAC address and an IP address, included in the radio waves transmitted from the connected MFP, and registers the acquired apparatus information in the MFP application.

Referring to FIG. 6, first, upon receipt of wireless radio waves (YES to a step S601), the CPU 301 acquires apparatus information included in the received radio waves (step S602), and stores the acquired apparatus information in the RAM 303. Then, the CPU 301 determines whether or not the acquired apparatus information has already been registered in the MFP application (step S603) (operation of a determination unit).

If it is determined in the step S603 that the acquired apparatus information has not been registered in the MFP application, the CPU 301 returns to the step S601. On the other hand, if it is determined in the step S603 that the acquired apparatus information has already been registered in the MFP application, the CPU 301 estimates the distance to the MFP as the transmission source of the wireless radio waves, based on the radio wave strength of the received wireless radio waves (step S604) (operation of a distance estimation unit). Then, the CPU 301 determines whether or not the notification condition is satisfied (step S605). More specifically, the CPU 301 determines whether or not the estimated distance is not larger than a predetermined notification-enabling distance, e.g. 30 cm. In the step S605, if the estimated distance is not larger than 30 cm, the CPU 301 determines that the notification condition is satisfied. On the other hand, if the estimated distance is larger than 30 cm, the CPU 301 determines that the notification condition is not satisfied.

Figure 7A:
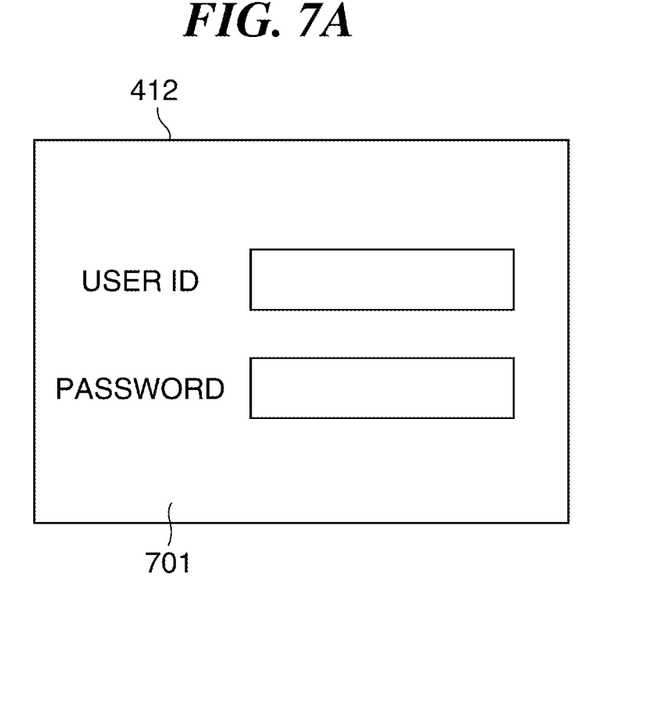
FIG. 7A is a diagram showing a login screen displayed on the MFP.
Figure 7B:
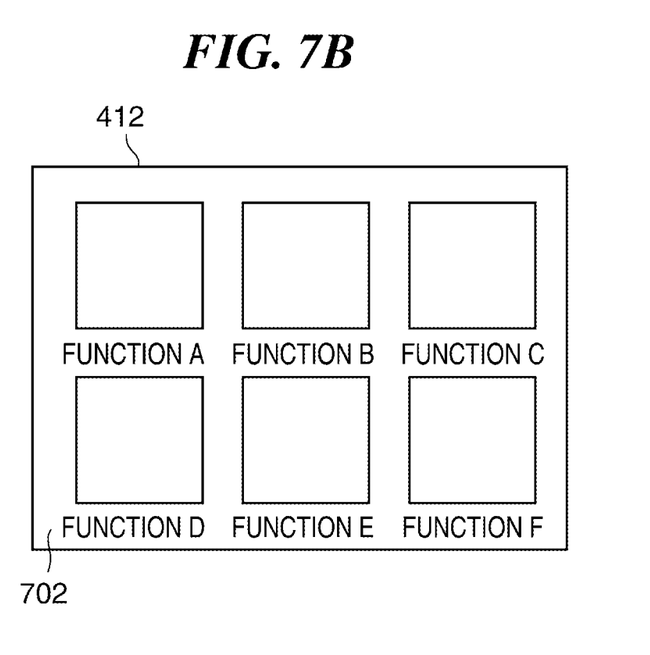
FIG. 7B is a diagram showing an operation screen displayed on the MFP.

If it is determined in the step S605 that the notification condition is not satisfied, the CPU 301 returns to the step S601. On the other hand, if it is determined in the step S605 that the notification condition is satisfied, the CPU 301 causes the notification 501 to be displayed on the console section 308 by a notification function (step S606). The CPU 301 can cause a message to be output by the notification function while causing the MFP application to run in the background. After that, when the notification 501 is touched by the user on the console section 308 (YES to a step S607), the CPU 301 transmits the login information to the MFP having transmitted the wireless radio waves, e.g. the MFP 102 (step S608), followed by terminating the present process. The MFP 102 performs authentication processing based on the received login information, and if the authentication processing is successful, the MFP 102 is shifted to a logged-in state. Before being shifted to the logged-in state, the MFP 102 displays a login screen 701 shown in FIG. 7A, on the console section 412. In this state, the MFP 102 is incapable of receiving a job execution instruction input by operating the console section 412. On the other hand, when shifted to the logged-in state, the MFP 102 switches the display on the console section 412 from the login screen 701 to an operation screen 702 shown in FIG. 7B, and the MFP 102 becomes capable of receiving a job execution instruction input by operating the operation screen 702.

According to the above-described login information transmission process in FIG. 6, the notification 501 is displayed on the console section 308 in a case where an MFP as a transmission source of the received wireless radio waves has already been registered in the MFP application. That is, even when another MFP which is not used by the user satisfies the notification condition, the notification 501 with respect to the other MFP, which is unnecessary for the user, is prevented from being displayed on the console section 308. This makes it possible to prevent an unnecessary notification from being provided.

Further, in the above-described login information transmission process in FIG. 6, the notification 501 is a login notification for confirming with the user whether or not to log into an MFP as a transmission source of the received wireless radio waves from the mobile terminal 101. This makes it possible to prevent an unnecessary login notification from being provided.

Furthermore, in the above-described login information transmission process in FIG. 6, since wireless communication is BLE communication or Wi-Fi communication, it is possible to prevent an unnecessary notification with respect to an MFP as a transmission source of wireless radio waves using BLE communication or Wi-Fi communication from being provided.

Although the description of the present invention is given based on the above-described embodiment, the present invention is not limited to the above-described embodiment. For example, the notification 501 may be a notification using a dialog box.

Further, in the above-described embodiment, the notification 501 is not limited to a login notification, but may be a notification for confirming with a user whether or not to give an instruction associated with remote control, such as an instruction for executing printing.

Further, in the above-described embodiment, the user may be caused to set whether or not to display the notification 501 on the console section 308, with respect to an MFP registered in the MFP application.

For example, although the MFPs 102 to 104 have been registered in the MFP application, there is a case where a user switches the MFP to be used in accordance with its use e.g. due to differences in functions between the MFPs 102 to 104. In this case, it is preferable not to provide a login notification with respect to an MFP which is not to be used, even if the MFP has already been registered.

To cope with this, in a first variation of the embodiment, the user is caused to set whether or not to provide a login notification with respect to a registered MFP.

Figure 8:
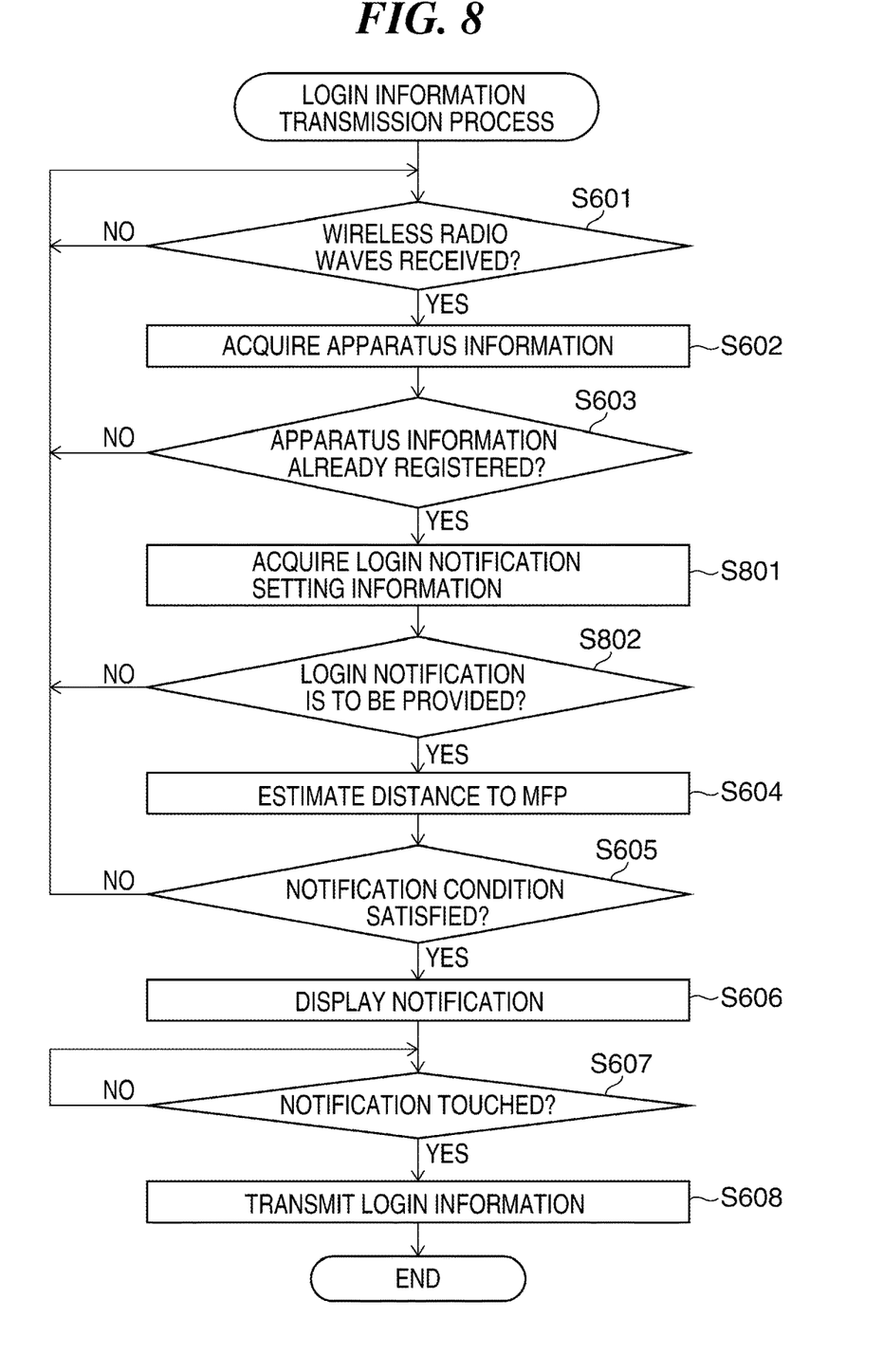
FIG. 8 is a flowchart of a first variation of the login information transmission process in FIG. 6.

FIG. 8 is a flowchart of a first variation of the login information transmission process in FIG. 6.

Figure 9:
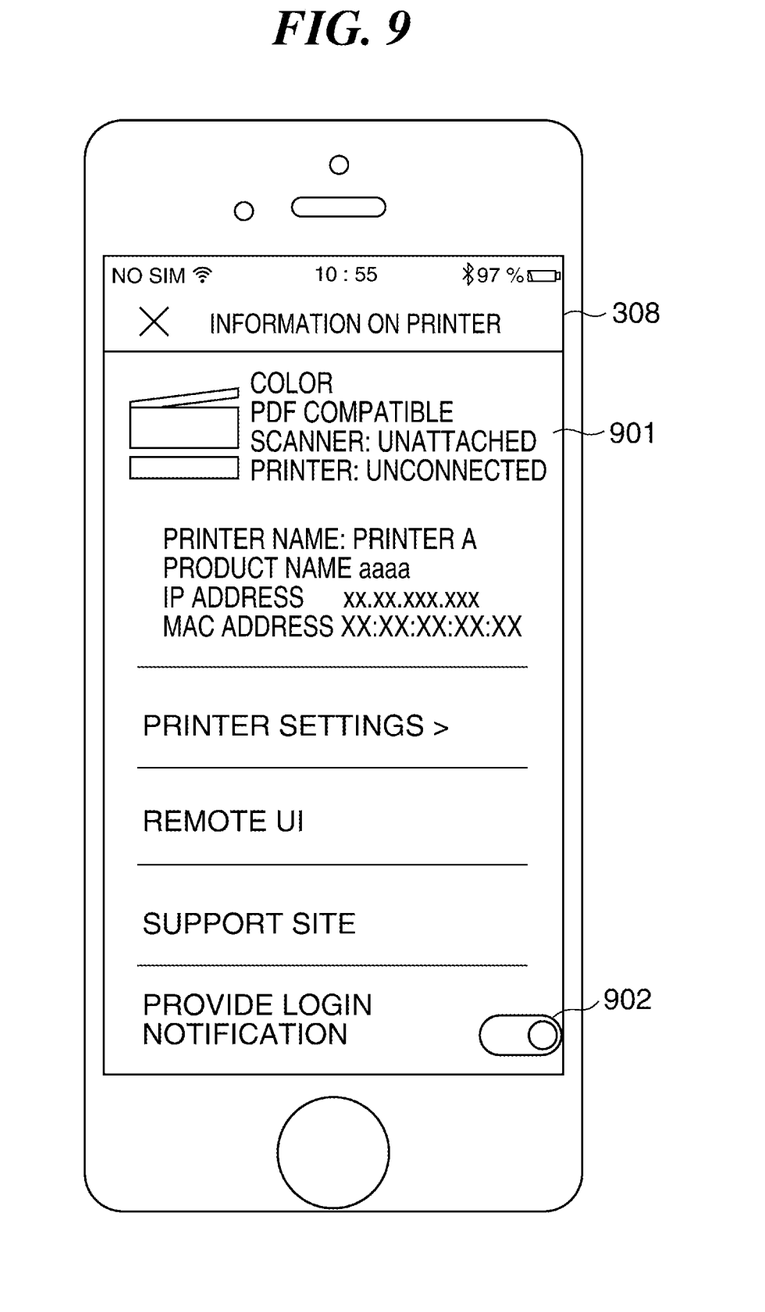
FIG. 9 is a diagram showing an example of a screen displayed on the mobile terminal.

The first variation of the login information transmission process in FIG. 8 is performed by the CPU 301 that executes a control program of the MFP application, stored in the ROM 302, and it is assumed that wireless radio waves are transmitted from the MFPs 102 to 104 and other MFPs than these. Further, in the first variation of the login information transmission process in FIG. 8, it is assumed that the MFPs 102 to 104 have already been registered in the MFP application by registration processing performed in advance, and provision of a login notification has been set only with respect to the MFP 102 in advance, by way of example. In the first variation of the embodiment, the user can set whether or not to provide a login notification with respect to each registered MFP, by operating a switching switch 902 (setting unit) on an operation screen 901, shown in FIG. 9, displayed on the console section 308 of the mobile terminal 101. By setting the switching switch 902 to on, provision of the login notification is set, whereas by setting the switching switch 902 to off, no provision of the login notification is set. The setting information of the switching switch 902 (hereinafter referred to as the "login notification setting information"), set with respect to each MFP, is stored in the RAM 303.

Referring to FIG. 8, first, the CPU 301 executes the steps S601 to S603.

If it is determined in the step S603 that the acquired apparatus information has not been registered in the MFP application, the CPU 301 returns to the step S601. On the other hand, if it is determined in the step S603 that the acquired apparatus information has already been registered in the MFP application, the CPU 301 acquires the login notification setting information of the MFP, indicated by the acquired apparatus information (step S801). Then, the CPU 301 determines whether or not to provide the login notification based on the acquired login notification setting information (step S802).

If it is determined in the step S802 that the login notification is to be provided, the CPU 301 executes the step S604 et seq. That is, in the first variation of the embodiment, even when the MFPs 102 to 104 have already been registered in the MFP application, the notification 501 is displayed on the console section 308 only in a case where the MFP 102, to which provision of the login notification has been set by the switching switch 902 in advance, satisfies the notification condition. On the other hand, if it is determined in the step S802 that the login notification is not to be provided, the CPU 301 returns to the step S601.

In the above-described first variation of the embodiment, whether or not to provide the login notification is set by a user with respect to a registered MFP. With this, in a case where the user switches the MFP to be used in accordance with its use, it is possible to prevent an unnecessary notification with respect to an MFP already registered but not suited to the use from being provided.

In a second variation of the embodiment, the distance to the MFP as the transmission source of the wireless radio waves may be estimated before the notification 501 is displayed on the console section 308, and further, immediately after the notification 501 is displayed on the console section 308.

Figure 10A:
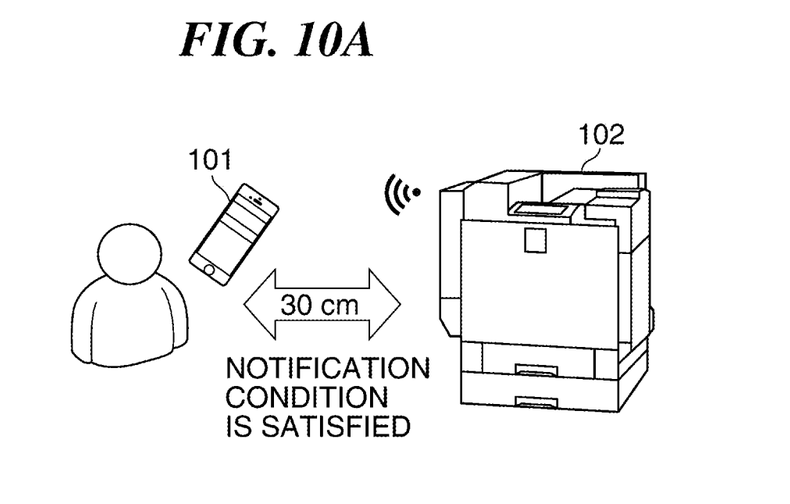
FIG. 10A is a diagram showing a case where the mobile terminal is at such a distance from the MFP that a notification condition is satisfied.
Figure 10B:
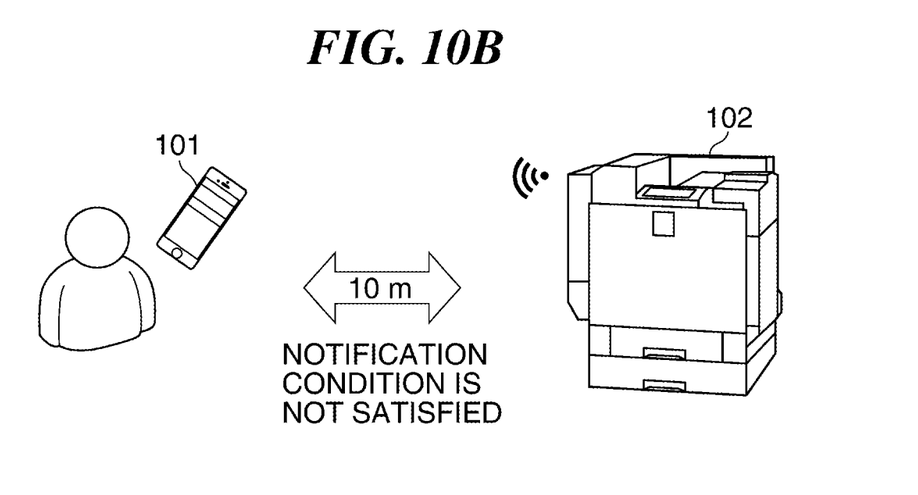
FIG. 10B is a diagram showing a case where the mobile terminal is at such a distance from the MFP that the notification condition is not satisfied.

In the login information transmission process in FIG. 6 and the first variation of the login information transmission process in FIG. 8, for example, in a case where the MFP 102 satisfies the notification condition as shown in FIG. 10A, the notification 501 is displayed on the console section 308 by execution of the step S604. Then, even after the mobile terminal 101 is moved away from the MFP 102 to a position at such a distance that the notification condition is no longer satisfied as shown in FIG. 10B, the notification 501 continues to be displayed on the console section 308 of the mobile terminal 101. However, in this state, the mobile terminal 101 cannot transmit the login information to the MFP 102, and hence it is preferable to delete the notification 501 from the console section 308 of the mobile terminal 101.

To cope with this, in the second variation of present embodiment, the distance to an MFP as a transmission source of wireless radio waves is estimated before the notification 501 is displayed on the console section 308, and further, immediately after the notification 501 is displayed on the console section 308.

Figure 11:
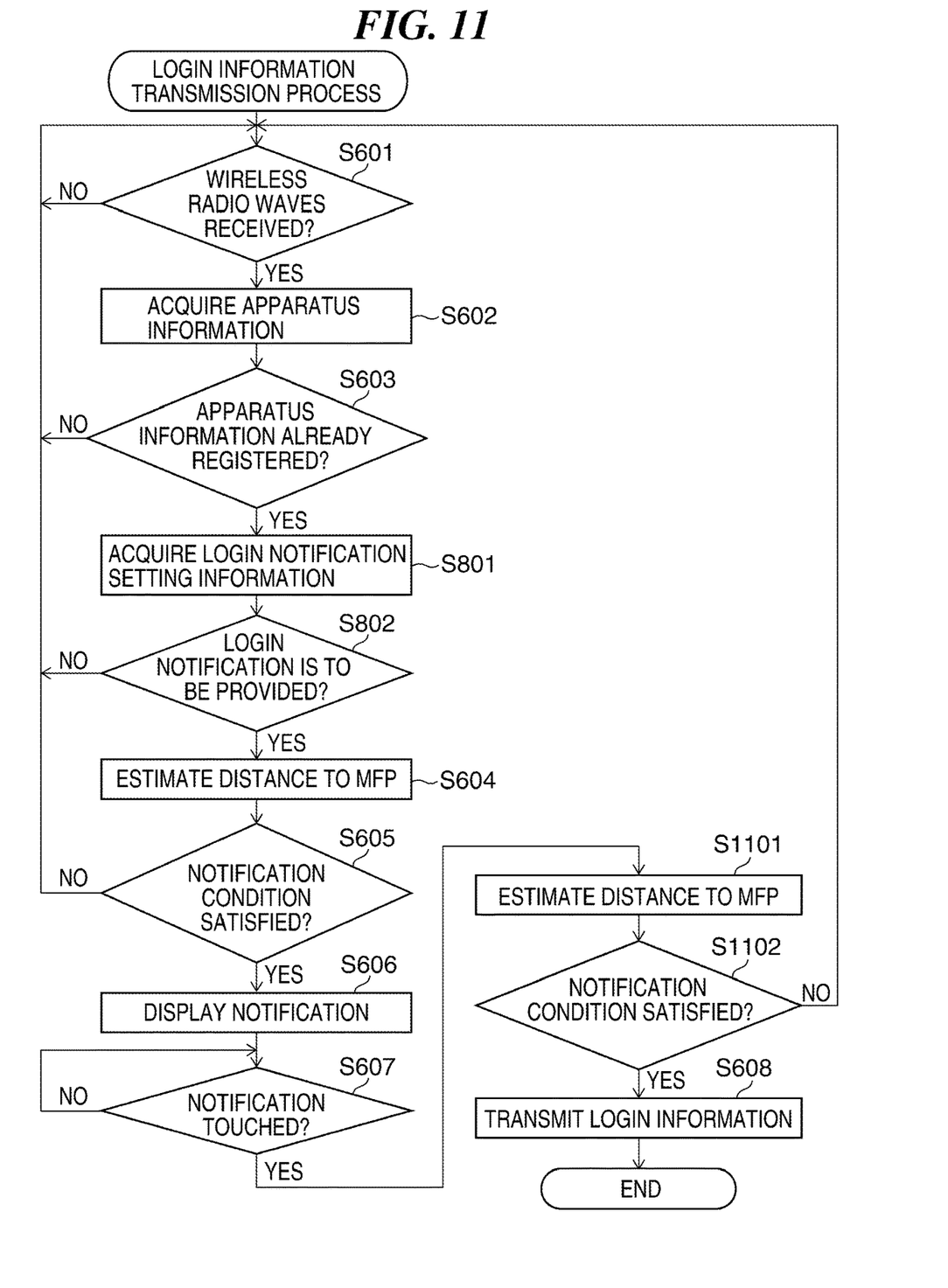
FIG. 11 is a flowchart of a second variation of the login information transmission process in FIG. 6.

FIG. 11 is a flowchart of a second variation of the login information transmission process in FIG. 6.

The second variation of the login information transmission process in FIG. 11 is performed by the CPU 301 that executes a control program of the MFP application, stored in the ROM 302, and it is assumed that wireless radio waves are transmitted from the MFPs 102 to 104 and other MFPs than these. Further, also in the second variation of the login information transmission process in FIG. 11, it is assumed that the MFPs 102 to 104 have already been registered in the MFP application by registration processing performed in advance, and provision of the login notification has been set only with respect to the MFP 102 in advance, by way of example.

Referring to FIG. 11, first, the CPU 301 executes the steps S601 to S603, S801, S802, and S604 to S607. When the notification 501 is touched by the user on the console section 308 (YES to the step S607), the CPU 301 estimates a distance to the MFP as the transmission source of the wireless radio waves, based on the radio wave strength of the received wireless radio waves (step S1101). Then, the CPU 301 determines whether or not the notification condition is satisfied (step S1102).

If it is determined in the step S1102 that the notification condition is not satisfied, the CPU 301 returns to the step S601. On the other hand, if it is determined in the step S1102 that the notification condition is satisfied, the CPU 301 executes the step S608 et seq.

In the above-described second variation of the embodiment, the distance to the MFP as the transmission source of the wireless radio waves is estimated before the notification 501 is displayed on the console section 308, and further, immediately after the notification 501 is displayed on the console section 308. This makes it possible to prevent provision of an unnecessary notification as would be performed in a case where the notification 501 is displayed on the console section 308 in spite of impossibility of transmission of the login information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101802 filed May 23, 2017, which is hereby incorporated by reference herein in its entirety.

What is claimed is:

1. A mobile terminal comprising:
a wireless interface configured to perform BLE (Bluetooth Low Energy) communication;
a display device configured to display information; and
one or more controllers configured to:
cause the display device to display notification information, based on reception of BLE radio waves via the wireless interface,
wherein the notification information is information for confirming by a user whether or not to log in to a source device of the received BLE radio waves, and
wherein the one or more controllers causes the display device to display a screen through which the user is allowed to designate via a touch object, prior to the reception of the BLE radio waves from the source device, whether or not to display the notification information for confirming by the user whether or not to log in to the source device of the received BLE radio waves on the display device based on the reception of the BLE radio waves from the source device.

2. The mobile terminal according to claim 1, wherein the BLE radio waves are waves transmitted from a device which was registered in advance.

3. The mobile terminal according to claim 1, wherein the BLE radio waves are waves of which radio wave strength at a time of reception satisfies a predetermined condition.

4. The mobile terminal according to claim 1, wherein the BLE radio waves are waves transmitted from a printer.

5. The mobile terminal according to claim 1, wherein the one or more controllers transmits a login request to the source device based on reception of a predetermined touch operation after the notification information is displayed.

6. The mobile terminal according to claim 1, wherein the one or more controllers determines whether or not information included in the received BLE radio waves match information registered in advance.

7. The mobile terminal according to claim 6, wherein the information included in the BLE radio waves is device information of the source device.

8. The mobile terminal according to claim 1, wherein the notification information is information output by an application running in background.

9. The mobile terminal according to claim 1, wherein the touch object is a selector.

10. A non-transitory computer-readable storage medium storing a computer-executable program for executing a method of controlling a mobile terminal having a wireless interface configured to perform BLE (Bluetooth Low Energy) communication and a display device configured to display information,
wherein the method comprises:
displaying notification information on the display device, based on reception of BLE radio waves via the wireless interface, wherein the notification information is information for confirming by a user whether or not to log in to a source device of the received BLE radio waves; and
displaying, on the display device, a screen through which the user is allowed to designate via a touch object, prior to the reception of the BLE radio waves from the source device, whether or not to display the notification information for confirming by the user whether or not to log in to the source device of the received BLE radio waves on the display device based on the reception of the BLE radio waves from the source device.

11. The non-transitory computer-readable storage medium according to claim 10, wherein the BLE radio waves are waves transmitted from a device which was registered in advance.

12. The non-transitory computer-readable storage medium according to claim 10, wherein the BLE radio waves are waves of which radio wave strength at a time of reception satisfies a predetermined condition.

13. The non-transitory computer-readable storage medium according to claim 10, wherein the BLE radio waves are waves transmitted from a printer.

14. The non-transitory computer-readable storage medium according to claim 10, wherein the method further comprises:
    transmitting a login request to the source device based on reception of a predetermined touch operation after the notification information is displayed.

15. The non-transitory computer-readable storage medium according to claim 10, wherein the method further comprises:
    determining whether or not information included in the received BLE radio waves match information registered in advance.

16. The non-transitory computer-readable storage medium according to claim 10, wherein the information included in the BLE radio waves is device information of the source device.

17. The non-transitory computer-readable storage medium according to claim 10, wherein the notification information is information output by an application running in background.

18. The non-transitory computer-readable storage medium according to claim 10, wherein the touch object is a selector.

* * * * *